(12) United States Patent
Bi

(10) Patent No.: US 9,160,200 B2
(45) Date of Patent: Oct. 13, 2015

(54) CONFIGURABLE BATTERY END-OF-LIFE INDICATOR

(75) Inventor: Haifeng Bi, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 569 days.

(21) Appl. No.: 11/966,644

(22) Filed: Dec. 28, 2007

(65) Prior Publication Data
US 2009/0167543 A1 Jul. 2, 2009

(51) Int. Cl.
*G08B 21/00* (2006.01)
*H02J 9/06* (2006.01)
*H02J 7/00* (2006.01)

(52) U.S. Cl.
CPC *H02J 9/06* (2013.01); *H02J 7/0047* (2013.01)

(58) Field of Classification Search
CPC .............. G01R 19/16542; G01R 31/3648; G01R 31/3682; G01R 31/3658; H01M 10/48; H01M 10/488; G08B 29/181; G08B 25/009
USPC .................. 340/500, 540, 635, 636.1–636.19
See application file for complete search history.

(56) References Cited

U.S. PATENT DOCUMENTS

| | | | |
|---|---|---|---|
| 4,673,826 A | 6/1987 | Masson | |
| 5,032,825 A | 7/1991 | Kuznicki | |
| 5,182,518 A | 1/1993 | Stich et al. | |
| 5,281,955 A * | 1/1994 | Reich et al. | 340/636.12 |
| 5,295,078 A * | 3/1994 | Stich et al. | 700/297 |
| 5,315,533 A * | 5/1994 | Stich et al. | 700/298 |
| 5,459,671 A | 10/1995 | Duley | |
| 5,615,129 A * | 3/1997 | Stich et al. | 700/297 |
| 5,677,615 A | 10/1997 | Takano et al. | |
| 5,684,404 A | 11/1997 | Millar | |

(Continued)

FOREIGN PATENT DOCUMENTS

| | | |
|---|---|---|
| JP | 05260682 | 10/1993 |
| JP | 06113484 | 4/1994 |

(Continued)

*Primary Examiner* — James Yang
(74) *Attorney, Agent, or Firm* — Scott P. Zimmerman, PLLC

(57) ABSTRACT

A method, system, and computer program product are disclosed for providing end-of-life indicators for uninterruptible power supply (UPS) systems. User input is received regarding designated conditions for activating the end-of-life indicator. The UPS system monitors itself to determine whether monitored conditions correspond to the designating conditions. Upon the monitored conditions corresponding to the designating conditions, an audible or visible end-of-life indicator is activated. For critical systems, a user may specify conservative settings for the designated conditions. For other systems, a user may provide a designated condition (i.e., user input) that results in maximizing service life for the UPS system or associated batteries and reducing costs of ownership and operation.

6 Claims, 4 Drawing Sheets

(56) References Cited

U.S. PATENT DOCUMENTS

| | | | |
|---|---|---|---|
| 5,781,448 A * | 7/1998 | Nakamura et al. | 700/293 |
| 6,191,500 B1 * | 2/2001 | Toy | 307/64 |
| 6,201,371 B1 | 3/2001 | Kawabe et al. | |
| 6,486,789 B2 * | 11/2002 | Germagian et al. | 340/693.5 |
| 6,624,635 B1 | 9/2003 | Lui | |
| 6,631,293 B2 | 10/2003 | Lyden | |
| 7,199,557 B2 | 4/2007 | Anbuky et al. | |
| 7,296,171 B2 * | 11/2007 | Hahn et al. | 713/324 |
| 7,880,438 B1 | 2/2011 | Cohen et al. | |
| 8,035,395 B2 | 10/2011 | Suzuki et al. | |
| 8,060,081 B2 | 11/2011 | Owens et al. | |
| 2002/0065935 A1 * | 5/2002 | Koperda et al. | 709/238 |
| 2004/0017199 A1 | 1/2004 | Kawakami | |
| 2005/0001627 A1 | 1/2005 | Anbuky et al. | |
| 2006/0017581 A1 | 1/2006 | Schwendinger et al. | |
| 2009/0009183 A1 * | 1/2009 | Mousavi et al. | 324/537 |
| 2009/0167543 A1 | 7/2009 | Bi | |

FOREIGN PATENT DOCUMENTS

| | | |
|---|---|---|
| JP | 06217473 | 8/1994 |
| WO | 2007056197 A2 | 5/2007 |

* cited by examiner

CONFIGURABLE BATTERY END-OF-LIFE INDICATOR

BACKGROUND

1. Field of the Disclosure

The present disclosure generally relates to monitoring and warning systems and in particular to end-of-life indicators for batteries.

2. Description of the Related Art

Uninterruptible power supply (UPS) systems may be used to back up critical systems in the event of power outages. UPS systems often rely on batteries that have a limited life. Systems for monitoring and alarming when a battery has reached its end-of-life often come from the battery manufacturer or the UPS system manufacturer in a fixed or pre-programmed configuration.

DESCRIPTION OF THE EMBODIMENT(S)

Figure 1:
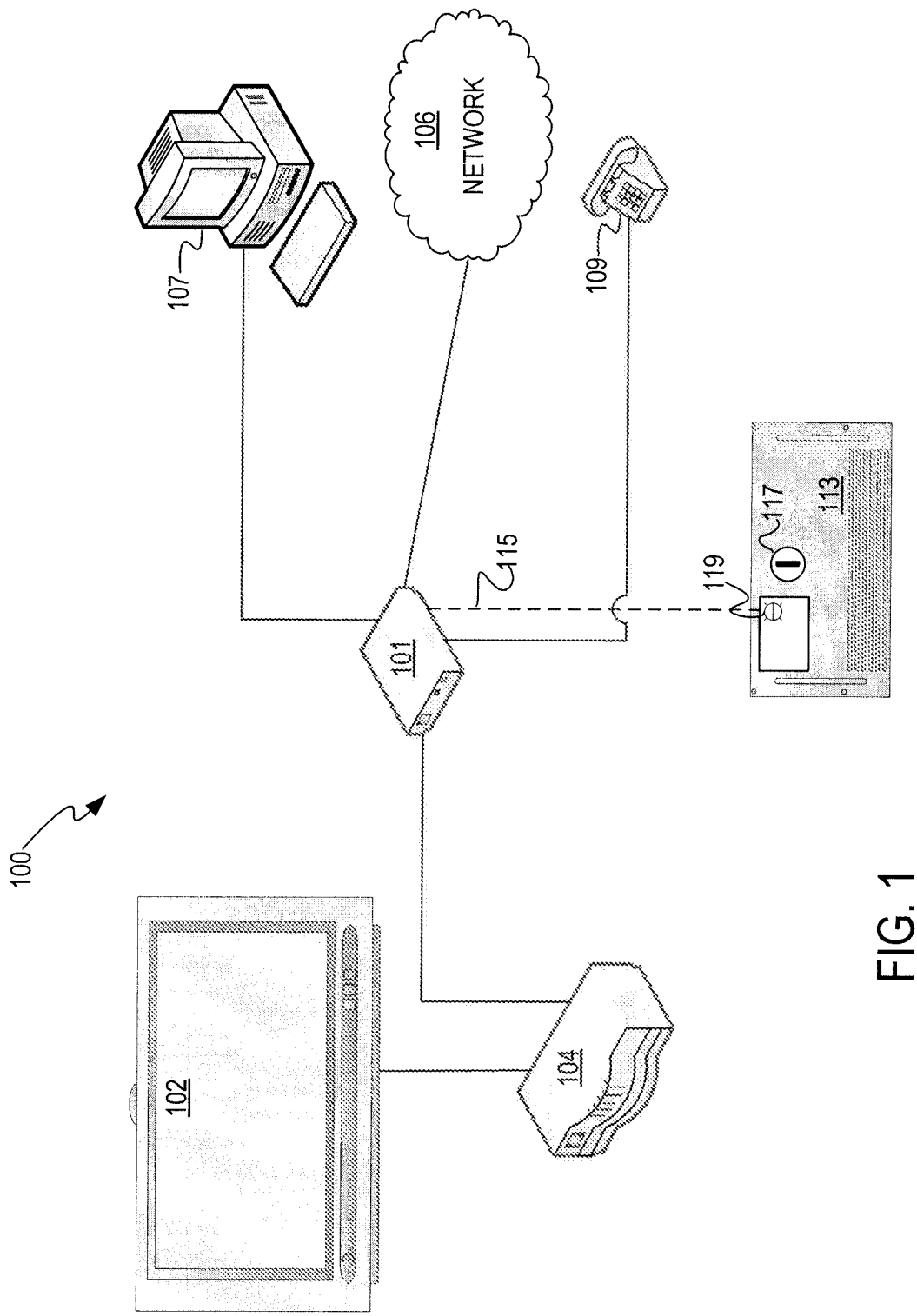
FIG. 1 illustrates an example environment for operating a UPS system and for providing an associated end-of-life indicator.

In one aspect, a UPS is disclosed which includes a tester for monitoring a performance characteristic of a power element. The UPS further includes an end-of-life indicator and an input for receiving an indicator of a designated condition under which the end-of-life indicator is activated. In addition, the UPS includes a controller for determining an end-of-life event based at least in part on the monitored performance characteristic and the received indicator. In some embodiments, the input of the UPS has a plurality of settings for specifying a requested period of operation for the power element during a power outage. The UPS may further include an interface for receiving the indicator of the designated condition. The controller may be enabled for measuring an output of the power element to estimate a load required of the power element during future operation. In some embodiments, the tester is enabled for monitoring performance of the power element by discharging the power element with a known load. The end-of-life indicator may include, in some combination, an audible alarm and a visual indicator on a display. Further, the uninterruptible power supply may be integrated into a residential gateway (RG).

In another aspect, a computer program product is disclosed. The computer program product is stored on a computer readable medium and has instructions for receiving a designated condition indicator regarding an end-of-life warning for The battery. Further instructions are operable for monitoring the battery for a monitored condition. Additional instructions are operable for comparing the designated condition to the monitored condition. If the monitored condition corresponds to the designated condition, further instructions are operable for activating the end-of-life warning. In some embodiments, further instructions are operable for calculating a remaining life parameter for the battery and comparing the remaining life parameter to a loaded discharge time parameter. The loaded discharge time parameter is specified by the designated condition that is received regarding the end-of-life warning.

In an additional aspect, a method is disclosed for providing end-of-life indications. The method comprises receiving a designated condition indicating a preference for generating an end-of-life indicator. The method further includes monitoring a battery for a monitored condition. In addition, the method includes comparing the monitored condition to the designated condition. An end-of-life indicator is provided in response to the monitored condition corresponding to the designated condition. In some embodiments, monitoring the battery for the monitored condition includes subjecting a battery output to a known load and measuring a response from the battery to the known load. In addition, some embodiments include estimating a reserve stored in the battery based at least in part on the measured response.

In the following disclosure, numerous specific details are set forth in order to provide a thorough understanding of the disclosed embodiments. A person of ordinary skill in the art should recognize that embodiments may be practiced without some of these specific details. In other instances, well-known structures and devices may be shown in block diagram form or omitted for clarity.

Battery backup systems or UPSs are used to temporarily provide backup power in the event of a power outage. Disclosed embodiments relate to configurable "replace battery" or "end-of-life" warnings that operate with UPS systems. An end-of-life indicator may be present on a UPS system in the form of a light emitting diode (LED), as text on a liquid crystal display (LCD), as an audible alarm, or using similar means to warn a user. When activated, an end-of-life indicator serves to warn the user that the battery in the UPS system has likely reached a pre-determined end-of-life condition and should be replaced as soon as possible. In many systems, the end-of-life conditions are chosen by the manufacturers of the UPS systems and cannot be changed once the UPS systems are manufactured. Disclosed embodiments provide a user with the ability to alter the conditions for providing end-of-life warnings. Disclosed systems monitor for designated conditions from the user regarding when to provide end-of-life warnings. The performance of the UPS system including its batteries is monitored for an occurrence of the designated conditions. Upon an occurrence of the designated conditions, an end-of-life warning is provided to the user. Disclosed systems promote maximizing a battery's useful life while allowing a user to decide and provide input regarding when an end-of-life warning is provided. For a critical UPS system in which a battery failure would be especially damaging, a user may provide conservative designated conditions upon which an end-of-life warning is provided. Otherwise, a user may provide, in non-critical situations, more aggressive designated conditions for providing end-of-life warnings to promote efficiencies regarding the cost of battery replacement.

In some embodiments, a UPS system is integrated into an appliance such as an RG or modem. In many cases, an RG is associated with providing Voice over Internet protocol (VoIP) telephone service that relies on alternating current (AC) service that is subject to interruptions. When a power outage occurs, the RG will not be able to operate unless it is equipped with an appropriate battery backup system. Accordingly, some RGs rely on integrated or external UPS systems to provide backup power in the event of a power outage. Therefore a battery backup system for the RG is needed in order to make critical phone calls (e.g., 911 emergency calls) during a power outage.

On some systems, the end-of-life indicators (e.g., LED, a beeping alarm, or both) on battery backup systems, if supported at all, may only activate based on some fixed conditions that are chosen by the manufacturers. Once manufactured, these indicators may not be configured by users in accordance with the user's individual requirements. If the manufacturer-provided, preconfigured conditions are chosen to provide a battery end-of-life warning that guarantees a long backup time, there may be associated waste and increased cost of ownership. On the other hand, if the manufacturer-provided, preconfigured condition is chosen to maximize the use of the battery, it may cause anxiety with some users if the users require a conservative approach with their UPS system. Therefore, disclosed embodiments provide users the ability to specify designated conditions for providing battery end-of-life warnings.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

FIG. 1 illustrates an environment 100 for operating a UPS system 113 and for providing an associated end-of-life indicator 119 in accordance with disclosed embodiments. Environment 100 may be, for example, a consumer's home that is outfitted for receiving VoIP service through telephone 109, broadband service for use on data processing system 107, and Internet protocol television (IPTV) for use on display 102. As shown, each of these services is received through RG 101 from network 106.

As shown, UPS system 113 provides backup power to RG 101 through conductor 115. If AC power (not shown) is lost, UPS system 113 contains one or more batteries for providing backup power to RG 101. In some embodiments, other components (e.g., set-top box 104 and data processing system 107) shown in environment 100 may receive backup power from UPS system 113. In addition to having one or more backup batteries, UPS system 113 may contain circuitry for converting direct current (DC) voltage to AC voltage or for changing the amplitude of a DC voltage as may be required to power the apparatuses shown in environment 100. As shown, UPS system 113 includes an adjustable input 117 and an end-of-life indicator 119. Adjustable input 117 may be a rotating knob that is turned by a user to provide designated inputs regarding conditions under which end-of-life indicator 119 should be activated. End-of-life indicator 119 may be an LED, an incandescent light bulb, a fluorescent light bulb, an audible alarm, or an icon presented on an LCD display, as examples.

Figure 2:
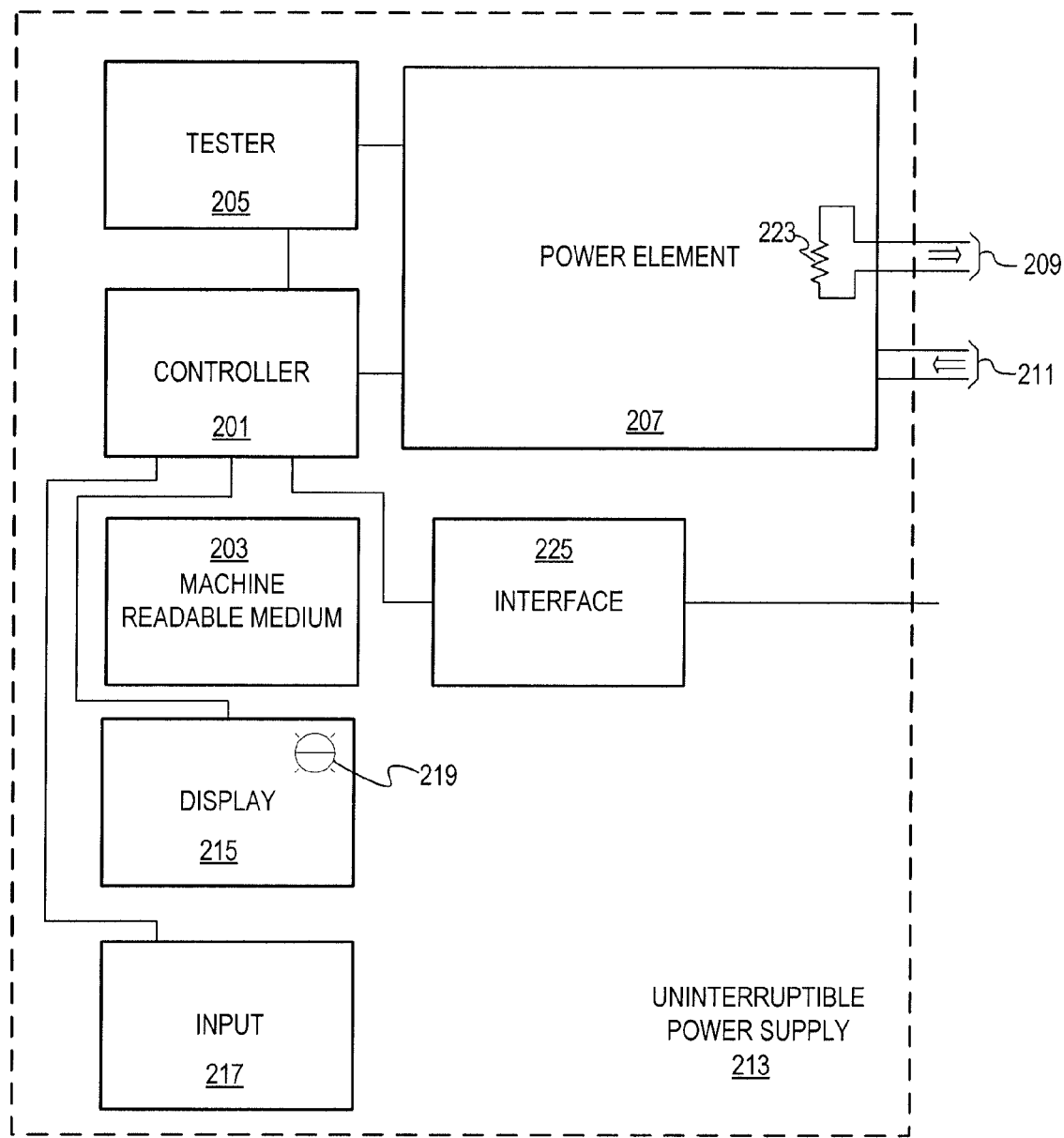
FIG. 2 depicts, in block diagram form, selected components of a UPS system.

FIG. 2 depicts, in block diagram form, selected components of a UPS system 213 which may be identical to or similar to UPS system 113 (FIG. 1). As shown, controller 201 is communicatively coupled to tester 205, which is for monitoring power element 207. Power element 207 may include overload protection (not shown) and inverting circuitry (not shown) for converting DC voltage into AC voltage. Interface 225 is for providing inputs to controller 201. For example, the user may provide, over a network, designated conditions regarding when end-of-life indicator 219 should be activated. As shown, end-of-life indicator 219 is part of display 215, which may be an LCD. Display 215 is in communication with controller 201, which may be a microcontroller or microprocessor operating machine executable instructions (i.e., a computer program product) stored on machine-readable medium 203.

Power element 207 may include one or more batteries or cells used to provide temporary, substitute power during an outage. Power element 207 is depicted having an output 209 and a power input 211. Power input 211 is used for charging power element 207. Output 209 is used for providing AC or DC output as required to backed up appliances such as RG 101 (FIG. 1). Output 209 may have hardware components (e.g., wires) that correspond to conductor 115 (FIG. 1). Although depicted as having two conductors, output 209 may have other conductors having varying voltage characteristics (e.g., voltage or frequency). Power element 207 may include resistive element 223, which may be used as a known load when testing the output 209. Under certain conditions, tester 205 may initiate testing power element 207 by causing output 209 to temporarily feed resistive element 223. While feeding resistive element 223, tester 205 may monitor the current (i.e., amperage) that is available to output 209. Tester 205 may also monitor other characteristics of power element 207 such as the temperature change during operation, the output impedance of output 209, the voltage at output 209, and the rate at which such variables change as power element 207 (through output 209) feeds resistive element 223. In addition, tester 205 may monitor power input 211, which is used for charging power element 207. Specifically, tester 205 may monitor the rate at which power element 207 receives current through power input 211. In addition, other parameters may be measured such as the voltage applied to power input 211.

Figure 3:
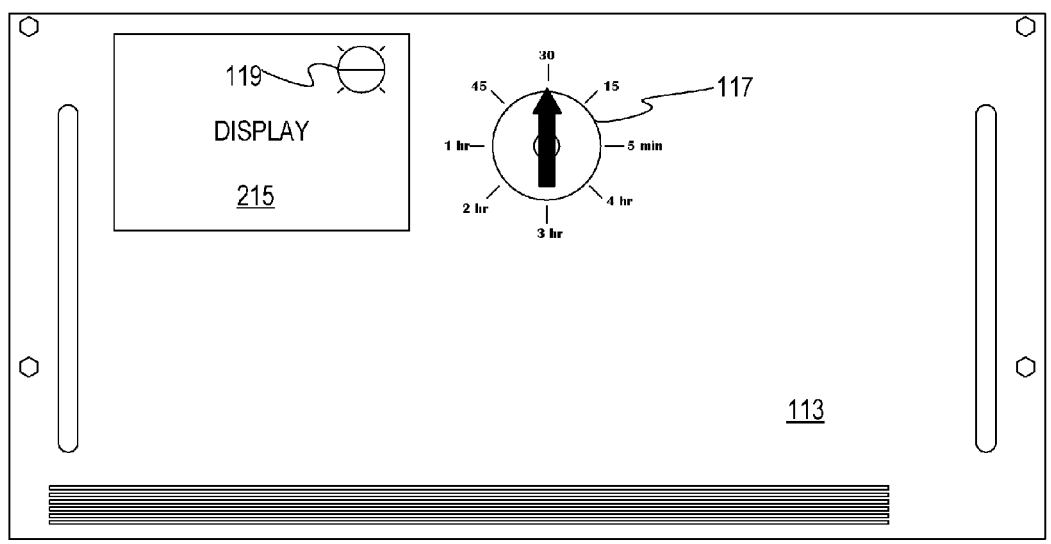
FIG. 3 illustrates an end-of-life indicator and adjustable input for use with a UPS system in accordance with disclosed embodiments.

After monitoring power element 207 to receive, record, determine, and otherwise calculate monitored conditions, tester 205 may operate in conjunction with controller 201 to estimate the end-of-life for power element 207 (or the batteries contained within power element 207). Using the monitored conditions obtained and designated conditions received from input 217, controller 201 determines whether end-of-life indicator 219 should be activated FIG. 3 illustrates an enlarged view of UPS system 113 (FIG. 1) including end-of-life indicator 119, which as shown, is integrated into display 215 (FIG. 2). In addition, FIG. 3 illustrates an embodiment of adjustable input 117 that includes a configuration dial integrated into UPS system 113. The configuration dial can be rotated by inserting a coin or a flat screwdriver into the slot in the center of the dial. As shown, the configuration dial has multiple markings for "dialing-in" a user preference for how much UPS backup time may be needed in the event of a power outage. The markings around the dial suggest that the end-of-life indicator is conditioned on the amount of backup time the battery backup system can support, which ranges between 5 minutes to 4 hrs. In FIG. 3, the dial is set vertically with the arrow pointing at 30 minutes. This will cause the end-of-life indicator 119 to illuminate or alarm when the UPS system 113 detects that it can no longer support 30 minutes of backup time. In a different scenario, the dial can be set with the arrow pointing at 3 hr. This will cause the end-of-life indicator 119 to activate when the UPS system 113 determines that its battery or batteries can no longer support 3 hours of backup time even when the battery or batteries have been fully recharged. In this manner, a user may choose to configure the end-of-life indicator to activate at a condition according to the user's requirements. In addition, disclosed embodiments are enabled for reconfiguring the end-of-life indicator to a more aggressive or more conservative approach as conditions change.

Although FIG. 3 illustrates a rotating dial for adjustable input 117, other configurations are possible in either mechanical or electronic form. For example, the rotating dial may instead be a mechanical slider switch. Alternatively, an electronic menu system may be presented on display 215, which may be a touch-screen in some embodiments. Still further, data processing system 107 may be enabled for communicating, through a network or otherwise, user preferences including designated conditions for triggering end-of-life indicator 119 to UPS system 113. In addition, the range of configuration settings may differ from that shown in FIG. 3, which is 5 minutes to 4 hours. Further, the range of configuration settings may also be configurable, for example using a software or firmware based system with UPS system 113. In addition, in some embodiments, a user may specify the type of metric or metrics used in determining when an end-of-life indicator is activated. For example, if a UPS system is used to backup a system in which output voltage is critical, an embodied system may be adjusted to activate an end-of-life indicator upon a drop in output voltage below a threshold value, which the user may set as a designated condition. Other embodied systems may trigger an end-of-life indicator upon user-designated conditions related to output current, charge time, average charging temperature, peak charging temperature, peak discharge temperature, average discharge temperature, time in use, total energy stored, output resistance, discharge rate and the like. In some embodiments, a UPS system may monitor itself and consider the rate of deterioration of any measured matrix, to predict when an end-of-life situation will occur. In addition, a UPS system may monitor and store data related to how a UPS system is likely to be used during a power outage based on operational data measured and recorded when a backed-up system is used under AC power. In addition to performing calculations to estimate when a battery's end-of-life has been reached, embodied systems may use look-up tables with stored data to estimate the occurrence of an end-of-life situation warranting the activation of an end-of-life indicator.

Figure 4:
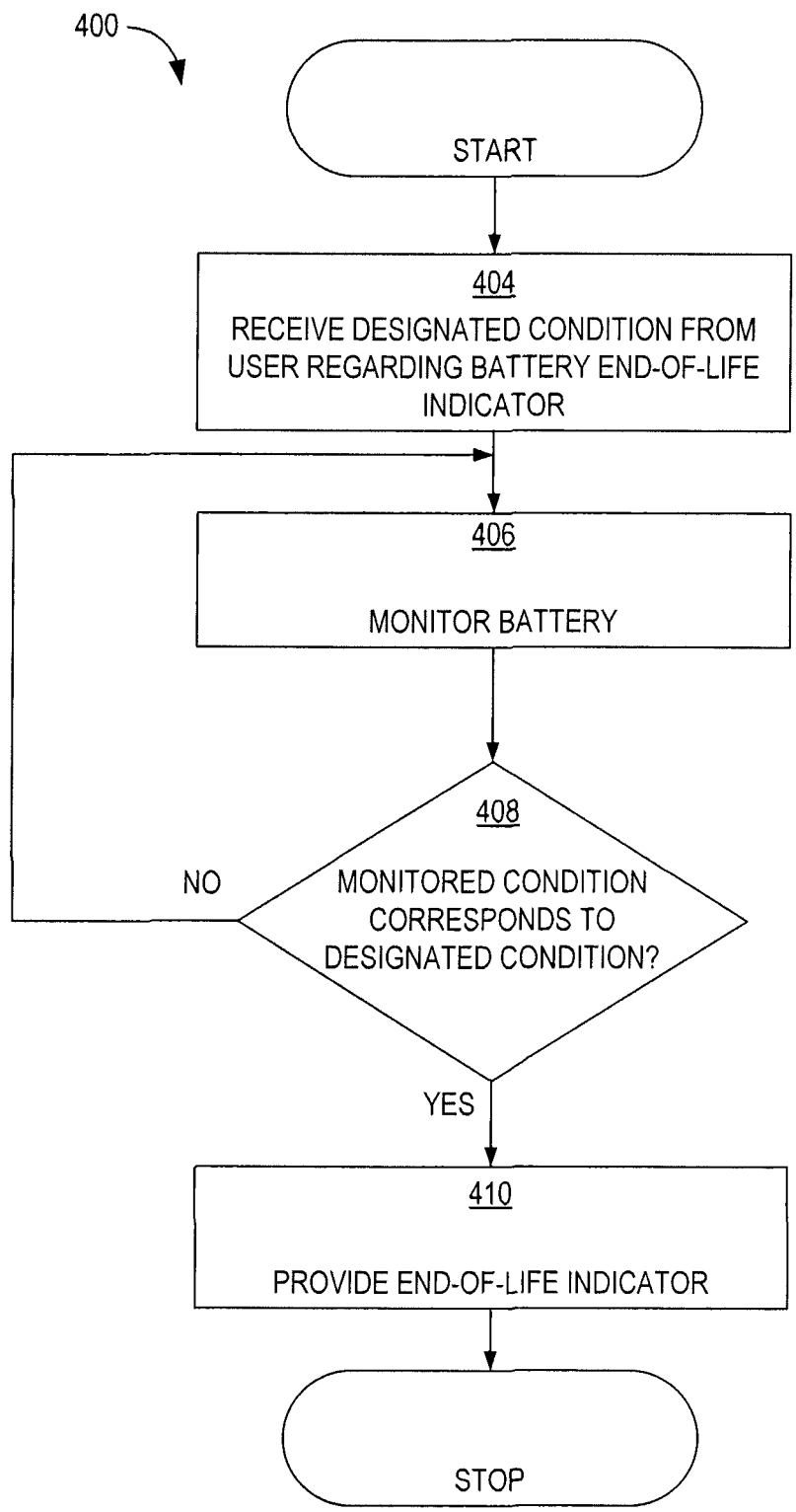
FIG. 4 illustrates selected aspects of a methodology for providing an end-of-life indicator in accordance with disclosed embodiments.

FIG. 4 illustrates selected aspects of a methodology 400 for providing an end-of-life indicator in accordance with disclosed embodiments. As shown, block 404 relates to receiving a designated condition indicating a preference for generating an end-of-life indicator. Block 406 relates to monitoring a battery. In some disclosed embodiments, the battery is part of a UPS system (UPS system 113 from FIG. 1). Block 406 may include receiving a monitored condition for the battery from a tester (e.g., tester 205 from FIG. 2). As shown, block 408 relates to determining whether the monitored condition corresponds to the designated condition received as a result of user input. If the monitored condition corresponds to the designated condition, the method proceeds to block 410, which relates to providing the end-of-life indicator. If the monitored condition does not correspond to the designated condition, methodology 400 returns to block 406 for further monitoring of the battery to receive further monitored conditions. Optional steps not illustrated in methodology 400 include subjecting a battery output to a known load, measuring a response from the battery to the known load, and estimating a reserve stored in the battery based at least in part on the measured response. Further optional steps include measuring a power output to estimate a load required of the battery during future operation. For example, tester 205 (FIG. 2) may monitor the current from output 209 during operation to determine what load may be expected of power element 207 during operation. This may occur temporarily and periodically to determine what load may be expected of power element 207 (or UPS system 213). This expected load may be used by controller 201 to calculate the total backup time that is available from UPS system 213. For example, for a light electrical load with only one apparatus in need of backup, UPS system 213 could provide a relatively longer duration of output than for a heavy electrical load consisting of four apparatuses, for example. In addition, methodology 400 may optionally include measuring a charge received by the battery and comparing the charge to a stored value. For example, a charge received over power input 211 (FIG. 2) may be measured by tester 205 (FIG. 2) and communicated to controller 201 (FIG. 2). The measured charge may be compared to values stored in machine-readable medium 203, which may include known specifications regarding power element 207. Alternatively, machine-readable medium 203 may store past values for measurements taken at power input 211. By comparing past values to present values for the charge received at power input 211, controller 201 may determine whether power element 207 is degrading over time. The level of degradation, for example, may then be used in methodology 400 as a monitored value for comparison to a designated value that is received from a user. Methodology 400 may also optionally include discharging the battery with a known load (e.g., resistive element 223) to determine a monitored value for comparison to a designated value.

A key component in many UPS systems is a rechargeable battery. Under normal operation when the AC power is present, the battery is continuously recharged. When there is an AC power outage, the battery begins to discharge, providing backup power to RG 101, for example. When the AC power is restored, the battery begins to recharge itself again. This cycle repeats. A battery's ability to charge and discharge is limited. A battery may be characterized to have reached its "end-of-life" when it cannot adequately hold charge at a pre-determined level. When the UPS determines that the battery has reached that condition, it activates the "end-of-life" indicator, typically found on the front panel of a UPS (i.e., battery backup system). The indicator may be activated in the form of a lit LED and/or a beeping alarm. This alerts the user that the battery in the battery backup system has reached its "end-of-life" and must be replaced as soon as possible.

In some cases, it requires a subjective opinion as to decide when a battery has reached its end of life. Different metrics may be measured such as how long a battery takes to fully charge, output impedance, battery life under load, battery life when it is not under load, output voltage (loaded and unloaded) and output current. Disclosed embodiments may measure such metrics, receive input from a user that designates conditions under which an end-of-life indicator should illuminate, and monitor the battery for any occurrence of the designated conditions. In a more conservative approach, the designated conditions are entered to ensure a long backup time. This approach can cause wasteful use of the battery and increased cost of ownership to the users if batteries are replaced more often than necessary. In contrast, in a more aggressive approach, the condition is chosen to maximize the use of the battery and replace it more seldom. Such an approach may worry some users that the battery will not be able to provide them with much backup time if there is an emergency after the indicator is activated.

Referring again to FIG. 1, in an illustrative embodiment, UPS system 113 may provide 4 hours of backup time with a brand new battery or batteries. In a relatively conservative approach, the end-of-life indicator 119 may be configured to activate upon UPS system 113 (using, for example, controller 201 from FIG. 2) determining that its battery or batteries can only provide 3 hours of backup during a power outage. If UPS system 113 signals end-of-life indicator 119 to signal when UPS system 113's battery or batteries still have 3 hours of backup time, this may result in batteries that are still quite usable being thrown away. Depending on how critical the need is for having more than 3 hours of backup time, end-of-life indicator 119 may result in a burden to the user effort-wise and cost-wise. If a user wishes to have a more aggressive approach, the user may actuate adjustable input 117 to cause controller 201 (FIG. 2), for example, to trigger end-of-life indicator 119 upon tester 205, in combination with controller 201, determining that power element 207 has only 1 hour or less of backup time available. If a power outage occurs with UPS system 113 configured in this way by the user, UPS system 113 may only be able to provide a very short backup time, on the order of minutes. Although this approach maximizes the use of the battery (e.g., power element 207), its short backup time at the end of life may be unacceptable to critical applications, such as making emergency calls during an outage. Some users may prefer the more conservative approach for guaranteed and adequate backup time, and other users may tolerate a much shorter backup time in exchange for lower cost of ownership and longer use of the battery or batteries with UPS system 113.

While the disclosed systems may be described in connection with one or more embodiments, it is not intended to limit the subject matter of the claims to the particular forms set forth. On the contrary, it is intended to cover such alternatives, modifications and equivalents as may be included within the spirit and scope of the subject matter as defined by the appended claims.

What is claimed is:

1. An uninterruptible power supply, comprising:
    a battery;
    a circuitry converting direct current electrical power from the battery into alternating current electrical power;
    a tester measuring performance characteristics of the uninterruptible power supply and of the battery, the performance characteristics including a rate at which an amount of charge output by the uninterruptible power supply changes;
    an adjustable input having selections specifying different amounts of time that backup power is desired from the battery during a power outage;
    an interface receiving a user input selecting a desired backup time from the different amounts of time of the backup power from the battery during the power outage;
    a controller for
        determining a full charge duration of backup time available from the battery at a full charge, based on the performance characteristics,
        performing a comparison of the full charge duration of backup time to the desired backup time selected by the user input, and
        determining from the comparison that the battery cannot provide the desired backup time at the full charge; and
    an end-of-life indicator of the battery, the end-of-life indicator activated by the controller to indicate that at the full charge the battery is incapable of providing the backup power for the desired backup time selected by the user input;
    wherein the controller recommends replacement of the battery by activating the end-of-life indicator in response to the comparison.

2. The uninterruptible power supply of claim 1, wherein the adjustable input comprises a dial having a plurality of settings for specifying the desired backup time.

3. The uninterruptible power supply of claim 1, further comprising a display for displaying the desired backup time.

4. The uninterruptible power supply of claim 1, wherein the controller measures an output of the uninterruptible power supply to estimate a load required of the uninterruptible power supply during the power outage.

5. The uninterruptible power supply of claim 4, wherein the tester measures one of the performance characteristics of the uninterruptible power supply by discharging the uninterruptible power supply with a known load.

6. The uninterruptible power supply of claim 1, wherein the uninterruptible power supply is integrated into a residential gateway.

* * * * *